United States Patent Office 2,940,983
Patented June 14, 1960

2,940,983

HALOGEN SUBSTITUTED DINAPHTHOFURAN-DIONES

Mario Francesco Sartori, Wilmington, Del., assignor to E. I. du Pont de Nemours and Company, Wilmington, Del., a corporation of Delaware No Drawing. Filed Apr. 15, 1958, Ser. No. 728,563

6 Claims. (Cl. 260—346.2)

This application contains subject matter disclosed in my application Serial No. 654,661, filed April 24, 1957, now abandoned, and deals with novel organic compounds which are useful as dyes and intermediates. More particularly, this invention deals with novel organic compounds of the formula

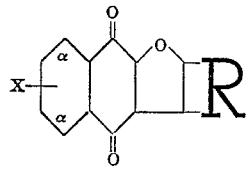

wherein X stands for a halogen atom such as Cl or Br, located in one of the α-positions, while R represents the group of atoms needed to complete the radical of a bicyclic aromatic compound which is free of water-solubilizing groups, said radical sharing two carbon atoms with the furan ring.

As specific illustrations of said bicyclic aromatic compound which shares two carbon atoms with the furan ring may be mentioned α-naphthol, β-naphthol, the arylamides of 3-hydroxy-2-naphthoic acid, for instance 3-hydroxy-2-naphthanilide,
2'-chloro-3-hydroxy-2-naphthanilide,
3-hydroxy-2-naphtho-o-toluidide, or
3-hydroxy-2-naphtho-o-anisidide, and lower alkyl esters 3-hydroxy-2-naphthoic acid, such as the methyl, ethyl, propyl (n or iso) or butyl esters.

I have found that the compounds of the above formula are yellow to orange crystalline materials, which are useful as disperse dyes for polyester fiber such as polyethylene terephthalate fiber or the acid-modified variations thereof. By the latter expression I mean polyester fiber containing metal sulfonate groups, as described more fully in Belgian Patent No. 549,179, granted July 14, 1957.

The dyeings on said fibers with the chloro or bromo compounds of the above general formula are characterized particularly by yielding bright, strong dyeings of good sublimation fastness. The novel halogeno compounds are further useful as intermediates for the preparation of anthraquinone-carbazole type vat dyes, by processes analogous to those set forth in my said copending application Serial No. 654,661, now abandoned.

More particularly, the novel compounds may be condensed in known manner with an α-amino anthraquinone, for instance 1-amino-anthraquinone, or 1-benzamido-4-, 5-or 8-amino-anthraquinone, to give the corresponding anthrimide, which in turn may be ring-closed in known manner to the corresponding carbazole type compound.

The novel compounds of this invention may be prepared by several methods, which include direct synthesis from compounds of simpler formulas as well as replacement of the amino group in analogous compounds of the same cyclic structure as the formula above.

These various methods are fully illustrated by the examples which follow, it being understood, however, that these examples are not intended to limit this invention. Parts mentioned are by weight.

*Example 1.—Sandmeyer transformation of corresponding amino compound, mixture*

To a solution of 6.2 parts of aminodinaphtho[2,1-2',3']furan -8,13-dione, mixture (obtained as in Example 5 of my copending application, Serial No. 715,489) in 96% sulfuric acid (62 parts), cooled to 5° C., was added portionwise sodium nitrite (1.4 parts). After stirring for 4 hours at 5° C., the obtained diazo solution was slowly poured under the surface of a solution of cuprous bromide (10 parts) in hydrobromic acid (200 parts). After stirring 2 hours at room temperature the reaction mixture was diluted with water (500 parts), slowly heated to 90° C. and agitated at this temperature for one hour. The formed precipitate was filtered off, washed with water and crystallized from acetic acid to yield bromodinaphtho[2,1-2',3']-furan-8,13-dione as orange crystals.

Similarly, the chloro analog is obtained when the cuprous bromide and the hydrobromic acid used in this example are replaced by equivalent amounts of cuprous chloride and hydrochloric acid.

When the amino mixture named above is replaced in the procedures of this example, by an equal weight of aminodinaphthol[1,2-2',3']furan-7,12-dione, mixture (obtained as in Example 2 of my said copending application), the corresponding bromo and chloro derivatives are obtained.

*Example 2.—Sandmeyer transformation, single isomer*

1 part of 11-aminodinaphthol[1,2-2',3']furan-7,12-dione (the isomer of M.P. 302–304° C. obtained in Example 12 of my copending application Serial No. 715,489) was slurried in 30 parts of 85% phosphoric acid, and to this suspension, cooled to 5° C., were added 1.5 parts of 36% hydrochloric acid and, portionwise, 0.25 part of sodium nitrite. After stirring for 3 hours at 5° C. the obtained diazo solution was slowly poured under the surface of a solution of 2 parts of cuprous chloride in 100 parts of 18% hydrochloric acid. After stirring for one hour at room temperature the orange slurry was slowly heated to 90° C. and agitated at this temperature for one hour. The formed orange precipitate was filtered off, washed and crystallized from acetic acid to yield 11-chlorodinaphtho[1,2-2',3']furan-7,12-dione of the formula:

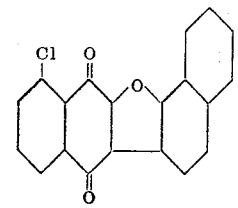

Similarly, the 11-bromo analogue is obtained when the cuprous chloride and the hydrochloric acid used in this example are replaced by equivalent amounts of cuprous bromide and 48% hydrobromic acid.

If in lieu of the 11-amino isomer one starts in the above example with 8-aminodinaphtho[1,2-2',3']furan-7,12-dione (the isomer of M.P. 362–364° C. obtained in Example 12 of my copending application, Serial No. 715,489), one obtains the 8-chloro and 8-bromo derivatives, respectively.

Likewise, the initial aminodinaphthofuran-dione in the above example may be replaced by 12-aminodinaphtho[2,1-2',3']furan-8,13-dione (the isomer of M.P. 338° C. obtained in Example 10 of my copending application, Serial No. 715,489), in which event, the process produces the 12-chloro or 12-bromo derivative, respectively.

Example 3.—Direct synthesis 1.3 parts of 2,3,5-trichloro-1,4-naphthoquinone, prepared following the procedure described by Fries and Kohler in Ber. 57, 496—499—502 (1924), were heated with a solution of 0.8 part of 1-naphthol in 10 parts of pyridine for 3 hours at 100° C. After stirring the reaction mass at 20° to 25° C. for 6 hours, the precipitate was filtered and washed with ethanol. The crude product thus obtained was purified by repeated extractions with hot water followed by crystallization from acetic acid. The purified product is an orange powder, and constitutes a mixture of 8-chloro and 11-chlorodinaphtho-[1,2-2',3']furan-7,12-dione. The absorption maxima of an orthodichlorobenzene solution of this isomeric mixture are located at 360 and 430 millimicrons.

When the 1-naphthol is replaced by an equal amount of 2-naphthol in the procedure of this example, a mixture of 9-chloro and 12-chlorodinaphtho[2,1-2',3']furan-8,13-dione is obtained.

The 2,3,5-trichloro-1,4-naphthoquinone may be replaced in this example with 2,3-dibromo-5-chloro-1,4-naphthoquinone or with 2,3,5-tribromo-1,4-naphthoquinone. In the latter event, of course, the product is a mixture of two isomeric bromo compounds, the bromine being located in an α-position of the naphtho nucleus.

Example 4.—Direct synthesis by another route

To a solution of sodium methylate in methanol, prepared by slowly feeding 1.4 parts of sodium into 65 parts of anhydrous methanol and cooling to 15° C., were added 10 parts of naphtho[2,1-b]furan-1,2-dione (prepared by following the method described by M. Giua in Gazz. Chim. Ital. 54, 509 (1924)), and 14 parts of o-bromophenacyl bromide (cf. Lutz, J. Org. Chem. 12, 666 (1947)). The light amber solution obtained was stirred at room temperature for 15 minutes then refluxed for 8 hours, keeping the reaction mixture alkaline by addition of sodium hydroxide solution. After stirring further for 8 hours at room temperature, the yellow precipitate was filtered off and slurried with an excess of a dilute sodium hydroxide solution, to separate the unreacted starting materials. The insoluble product, after crystallization from ethanol, gave cream yellow crystals of M.P. 156–158° C.

The reaction up to this point may be explained by the following equation:

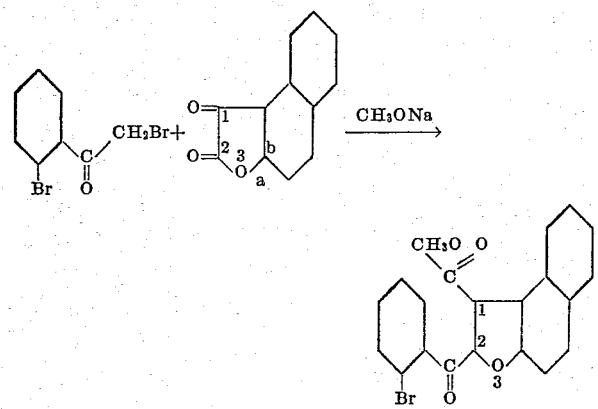

and the product thus obtained may be named: 2 - (o-bromobenzoyl) - 1 - naphthofurancarboxylic acid methyl ester.

Analysis.—Calculated for $C_{21}H_{13}O_4Br$: C, 61.5; H, 3.2. Found: C, 61.2; H, 3.4.

The free carboxylic acid was prepared by refluxing an alcoholic solution of the above ester (10 parts of the product in 80 parts of ethanol) for 0.5 hour with an excess of 30% aqueous sodium hydroxide. A clear amber solution was obtained at the boil. After 30 minutes at refluxing temperature the reaction mass was concentrated to 50 parts under vacuum, cooled to room temperature, made acid with concentrated hydrochloric acid, and the precipitate was filtered off. After crystallization from acetic acid, pale yellow crystals of M.P. 176–178° C. were obtained.

The above acid (6 parts) was converted to the acid chloride by stirring it with thionyl chloride (60 parts) at room temperature for 10 hours. Then the excess thionyl chloride was distilled off under vacuum, and to the residue, dissolved in nitrobenzene (50 parts), 24 parts of aluminum chloride were added gradually at room temperature. The reaction mass turned dark then violet. After 24 hours at room temperature (or 8 hours at 50° C.), the reaction product was drowned in ice and hydrochloric acid and the nitrobenzene was removed by steam distillation. The brown residue was filtered off, slurried with an excess of dilute alkali and filtered again. The crude product was purified by vatting, followed by crystallization from toluene. Orange crystals of 9-bromodinaphtho[2,1-2',3']furan-8,13-dione, melting at 320°–325° C., were obtained. The reaction described in this paragraph constitutes a ring-closure, according to the following equation:

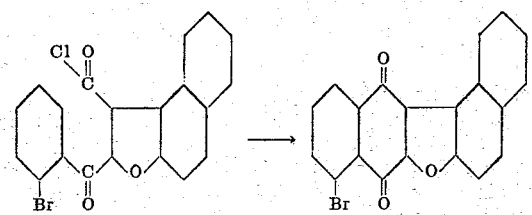

Analysis.—Calculated for $C_{20}H_9O_3Br$: C, 63.5; H, 2.4; Br, 21.2. Found: C, 63.5; H, 2.4; Br, 20.5.

When the o-bromophenacyl bromide, in this example, is replaced by 14 parts of o-chlorophenacyl chloride, 9-chlorodinaphtho[2,1-2',3']furan-8,13-dione is obtained.

Example 5.—Carboxanilide compound

One part of a mixture of 9-amino- and 12-amino-8,13-dioxodinaphtho[2,1-2',3']furan-6-carboxanilide, obtained by condensing 5-nitro-2,3-dichloro-1,4-naphthoquinone with an equal molar proportion of 3-hydroxy-2-naphthanilide following the procedure described in Example 1 of my copending application, Serial No. 715,489 and then reducing as described in Example 2 of the same application, was slurried in 30 parts of 85% phosphoric acid and to the suspension, cooled at 5° C. were added 36% hydrochloric acid (1.5 parts) and, portionwise, sodium nitrite (0.25 part). After stirring for 5 hours at 5° C. the diazo solution was slowly poured under the surface of a solution of cuprous chloride (2 parts) in 18% hydrochloric acid (100 parts). After stirring for one hour at room temperature the orange slurry was slowly heated to 90° C. and agitated at this temperature for one hour. The formed yellow precipitate was filtered off, washed and crystallized from o-dichlorobenzene to give a mixture of 9-chloro- and 12-chloro - 8,13 - dioxodinaphtho[2,1-2',3']furan-6-carboxanilide as yellow powder of M.P. 280° to 284° C.

Analysis.—Calculated for $C_{27}H_{14}O_4NCl$: C, 71.5; H, 3.1; N, 3.1; Cl, 7.8. Found: C, 71.5; H, 3.3; N, 2.9; Cl, 7.1.

The mixed product may be expressed by the formula

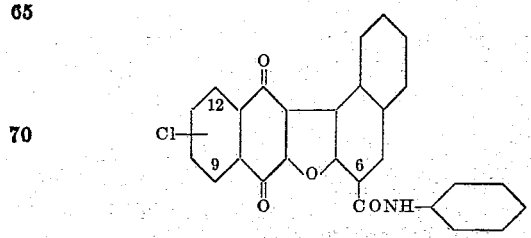

wherein the Cl is located in position 9 or 12.

It will be noted that the synthesis illustrated in Example 4 leads to a product which is a single isomer.

It will be understood that the details of the above examples may be varied widely within the skill of those engaged in this art.

I claim as my invention:

1. A compound of the formula

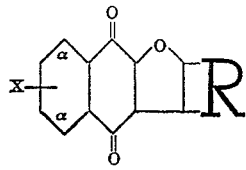

wherein X stands for a halogen atom of the group consisting of Cl and Br, located in one of the α-positions, while R represents the group of atoms needed to complete an ortho-naphthylene radical of one of the forms

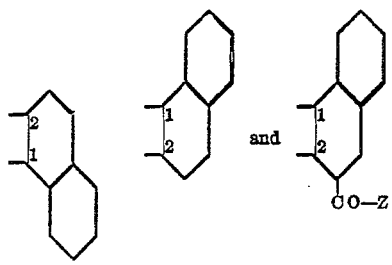

wherein Z is a substituent selected from the group consisting of anilino, chloranilino, toluidino, anisidino and O-alkyl in which the alkyl radical has from 1 to 4 C-atoms.

2. The process which comprises reacting, in alcoholic medium, the naphthofuran-dione of the formula

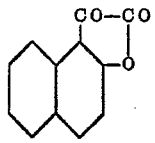

sodium methoxide and an ortho halogeno phenacyl halide of the formula

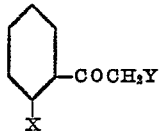

wherein X is a member of the group consisting of Cl and Br and wherein Y is a member of the group consisting of Cl and Br, to produce 2-(o-X-benzoyl)-1-naphthofuran-carboxylic acid methyl ester, heating the latter in alcoholic solution at reflux temperature with aqueous sodium hydroxide to convert said methyl ester to the free carboxylic acid, stirring the latter at room temperature with thionyl chloride to convert its COOH group into the COCl form, and reacting the latter in nitrobenzene solution, at temperatures from room temperature to 50° C., with aluminum chloride whereby to effect ring closure and produce a compound of the formula

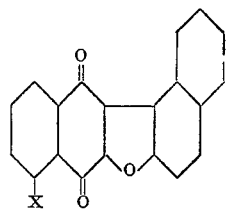

3. A compound having the formula

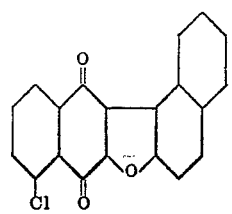

4. A compound having the formula

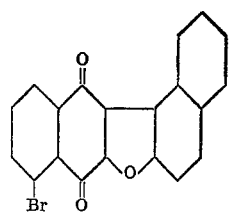

5. A compound having the formula

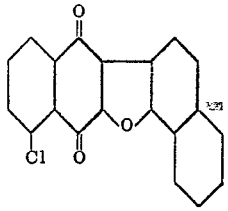

6. A compound having the formula

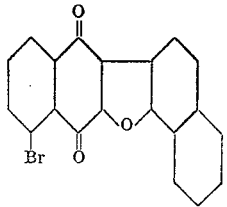

References Cited in the file of this patent

UNITED STATES PATENTS 2,813,875   Schmidt-Nickels _____ Nov. 19, 1957